United States Patent [19]

Beucker

[11] Patent Number: 4,551,894
[45] Date of Patent: Nov. 12, 1985

[54] URETHANE COVERED PAPER MACHINE ROLL WITH VENTED INTERFACE BETWEEN ROLL AND COVER

[75] Inventor: Albert W. Beucker, Factoryville, Pa.

[73] Assignee: Beloit Corporation, Beloit, Wis.

[21] Appl. No.: 542,433

[22] Filed: Oct. 17, 1983

[51] Int. Cl.[4] .............................................. B60B 7/04
[52] U.S. Cl. ...................................... 29/130; 100/121
[58] Field of Search ...................... 29/130, 132, 121.1, 29/121.6, 121.7, 121.3, 110, 116 R; 100/121, 176, 93 RP; 162/358, 360.1

[56] References Cited

U.S. PATENT DOCUMENTS

| 949,437 | 2/1910 | Munk | 29/121.6 X |
| 1,793,688 | 2/1931 | Gardella | 29/121.1 |
| 3,056,164 | 10/1962 | Reichel et al. | 29/121.6 X |
| 3,239,869 | 3/1966 | Komatsu | 29/110 X |
| 3,757,398 | 9/1973 | Urban | 29/132 X |
| 3,975,814 | 8/1976 | Harrowing | 29/121.1 X |

FOREIGN PATENT DOCUMENTS

| 2431923 | 1/1976 | Fed. Rep. of Germany | 29/110 |
| 189216 | 11/1922 | United Kingdom | 100/176 |

Primary Examiner—Howard N. Goldberg
Assistant Examiner—John T. Burtch
Attorney, Agent, or Firm—Hill, Van Santen, Steadman & Simpson

[57] ABSTRACT

Destruction of the bond of urethane roll covers to metal paper machine rolls is eliminated by venting the interface of the urethane and the metal to the atmosphere. Venting of the interface can be accomplished by drilling small holes through the roll periphery, by applying an adhesive substrate to the roll with grooves exposed to the atmosphere, by providing porous wicks between the roll and cover or by grooving the periphery of the roll to provide channels exposed to the atmosphere.

11 Claims, 10 Drawing Figures

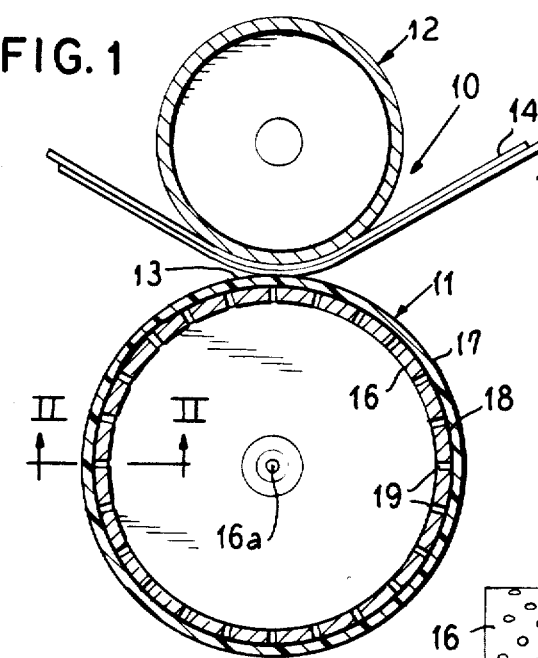
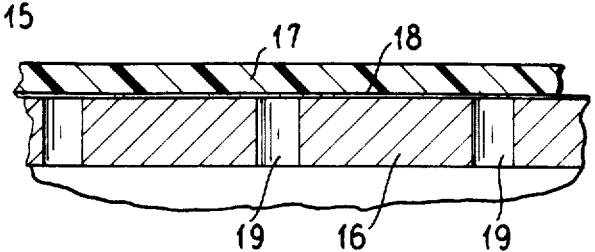
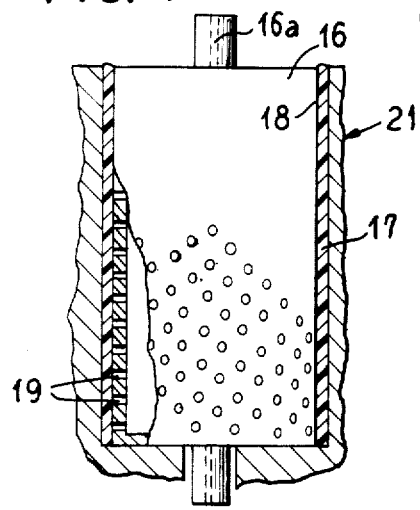
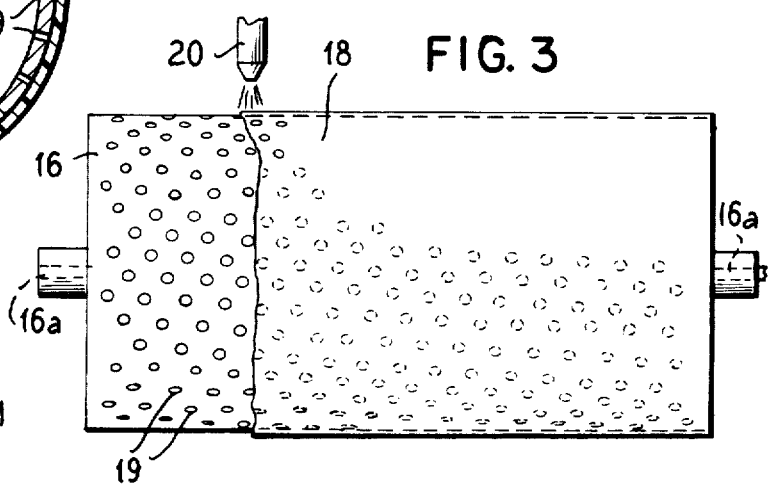
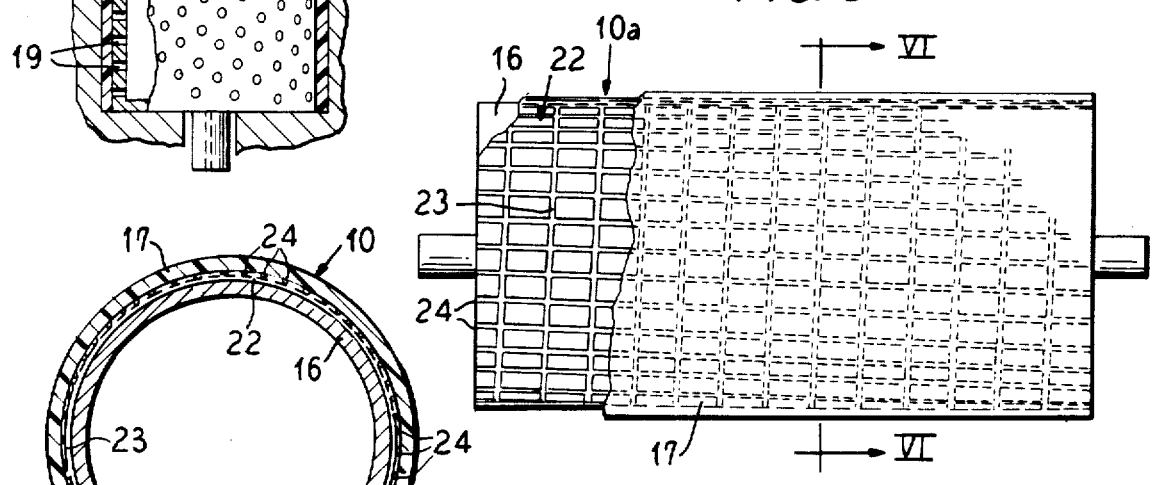
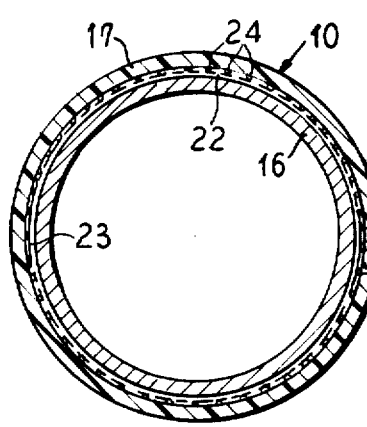

URETHANE COVERED PAPER MACHINE ROLL WITH VENTED INTERFACE BETWEEN ROLL AND COVER

FIELD OF THE INVENTION

This invention relates to the art of urethane covered paper machine rolls, and specifically deals with the elimination of the destruction of the bond between the urethane roll cover and the metal roll by venting the cover and roll interface to the atmosphere.

BACKGROUND OF THIS INVENTION

Urethane covered paper machine press rolls are known to have excellent abrasion resistance, vibration dampening and load bearing ability. However, the widespread acceptance of such rolls especially in the processing of wet webs in papermaking machinery, has been hampered by the loss of the bond between the urethane cover and the metal surface of the roll in a relatively short space of time. There are many known adhesives which will provide an excellent long lasting bond of urethane to metal if the assembly is maintained in a dry environment. It has been discovered that when urethane covered rolls are used in a wet environment, the initial excellent bond provided by these commercial adhesives disappear because moisture manifests itself at the urethane-metal bond line. It was originally thought that this loss of bond was due to the innate hydrolytic instability of urethane bonding adhesive systems. I have found that hydrolytic instability is an inconsequential factor in the loss of the bond.

I have discovered that temperature differentials between the urethane cover and the metal cause moisture to be formed at the bond line or interface between the metal and urethane. When the assembly is subjected to pressures such as exist in paper machine press roll assemblies receiving wet webs through the nips thereof, additional water is driven into the bond line or interface, inasmuch as the urethane cover is permeable to water. In any event, the temperature differential between the cover and the roll and the wet conditions under which the roll operates in press couples of papermaking machinery, develops moisture at the bond line or interface and the bond soon disintergrates, loosening the cover on the roll and rendering it unfit for any further use on the paper machine.

It would, therefore, be an important improvement in this art to maintain the bond between urethane roll covers and metal paper machine press rolls throughout a long wear life.

SUMMARY OF THE INVENTION

According to this invention, there are now provided urethane covered metal paper machine rolls with vented interfaces between the cover and metal which have useful wear lives far beyond heretofore known urethane covered rolls.

The rolls of this invention are formed by coating a substrate layer of urethane adhesive material on a metal paper machine press roll, the cylindrical surface of which has been abrasive blasted and degreased. The layer may be as thick as needed to provide a good bond. Thicknesses of 1/16 inch or less up to ¼ inch or more are useful. The coating can be effected by any known application procedure such as spraying, dipping, or brush or roller application. The adhesive used could be chosen from any of a number of proprietary cast urethane bonding adhesives offered by Conap, Inc., Olean, NY; Hughson Chemical Div. of Lord Corp., Erie, PA; Dayton Chemical Div. of the Whittaker Corp., West Alexandria, OH or others and would include adhesives with the tradenames of Conap AD 1147; Chemlok 205; Chemlok 218; Thixon 406; Thixon 405 or modifications of such adhesives.

A urethane polymer formulation is then cast around the substrate to a thickness sufficient to provide the desired roll cover. Thicknesses of about ⅜ to 1 inch are desirable for paper machine press roll covers and since the surface of the cover is preferably ground down to a desired finish, the initial casting thickness is in excess of that desired for the finished roll. A number of polyurethane casting formulations are commercially available to produce desired hardnesses. Paper machine press roll covers have hardnesses of 0 to 250 P and J or 40 to 50 Shore A to 70 to 80 Shore D.

Desired polyurethane formulations include polyether based urethanes since they are more resistant to hydrolysis and have desired hardness properties. Casting resins are conventionally chosen from the family of polytetramethylene glycol ether/T.D.I. (Toluene diisocyanate) prepolymers as represented by E. I. duPont Adiprenes or Uniroyal B-600 series of casting resins. These resins may be cured with any of a number of amine or polyol based curatives with 4,4'-methylene-bis (2-chloroaniline) the preferred curative.

To vent the bond or interface between the metal roll and cover for eliminating deterioration according to this invention, the metal roll can be provided with a grid pattern of drilled small holes in the nature of ⅛ inch in diameter and at spacings of ⅜ inch. Alternately, the substrate bond coat can be scraped or engraved in a grid pattern leaving connection conduits or grooves vented to the sides of the roll. The coating could be printed on the roll in a lattice pattern with the open grooves arranged so that they will discharge to the ends of the roll. Another alternate procedure is the wrapping of moisture absorbent wick cords in an open mesh pattern with open areas of ¼ to ½ inches in width or diameter around the adhesive coated roll with ends exposed to the atmosphere at the ends of the roll. A still further alternate arrangement is to groove the periphery of the roll, fill the grooves with a low melt material and then drain this material from the grooves after the cover has been applied.

The vents or voids are arranged in patterns that are inclined to the longitudinal axis of the roll so as to go through the pressure nip at an angle thus lessening the effect of any discontinuity in the cover on the stability of the nip and minimizing vibration in the press couple. For example, the drilled holes can extend diagonally along the length of the roll, the grooves in the substrate can have oval circumferential portions and diagonal longitudinal portions, the wick cords can extend diagonally along the length of the roll and can be wound helically around the roll. The grooved face of the roll can have helical circumferential portions intersecting with diagonally inclined longitudinal portions.

It is then an object of this invention to minimize bond failure of urethane covered paper machine rolls.

Another object of the invention is to vent the interface between the roll and roll cover of paper making machines for discharging moisture at the interface.

A still further object of the invention is to provide urethane covered paper machine press rolls with atmospheric vents for the interface between the roll and cover.

Another object of the invention is to provide a method of minimizing bond failure in urethane covered paper machine rolls.

Other and further objects of this invention will be apparent to those skilled in this art from the following detailed description of the annexed sheets of drawings which show best mode embodiments of the invention.

As shown on the drawings.

FIG. 1 is a schematic transverse cross-sectional view of a paper machine press roll assembly having a urethane covered vented roll of this invention.

FIG. 2 is a greatly magnified fragmentary cross-sectional view along the line II—II of FIG. 1.

FIG. 3 is a schematic side elevational view illustrating the coating of a vented press roll of this invention with a substrate bond for the urethane cover.

FIG. 4 is a diagrammatic sectional view illustrating the casting of the urethane cover on the substrate coated vented roll of FIG. 3.

FIG. 5 is a schematic side view of a press roll with a grooved substrate bond coated thereon and broken away to show the substrate.

FIG. 6 is a cross-sectional view along the line VI—VI of FIG. 5.

BRIEF DESCRIPTION OF THE ILLUSTRATED EMBODIMENTS

Figure 7:
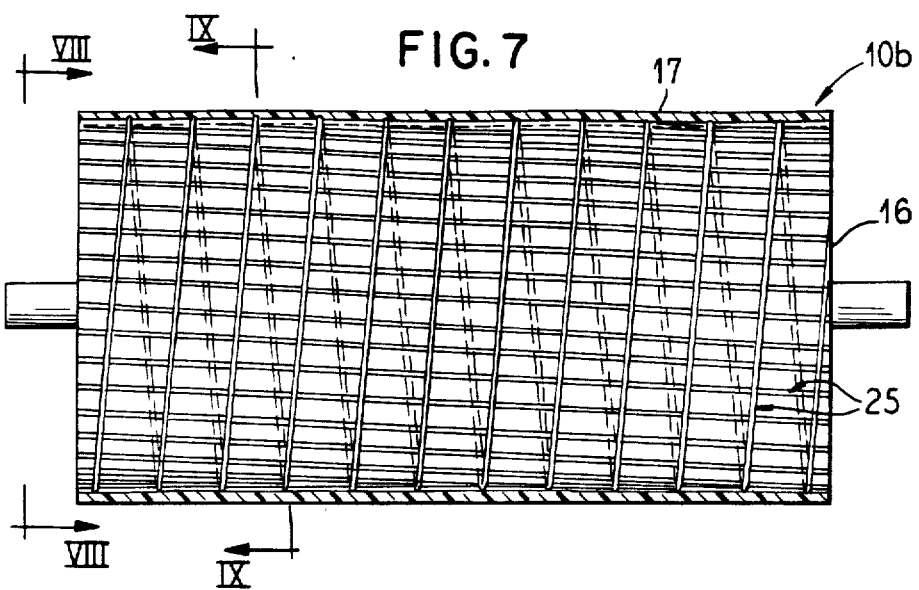
FIG. 7 is a diagrammatic side elevational view of a press roll wound with wick cord to vent the bond between the roll and cover to the atmosphere.

The press roll assembly 10 of FIG. 1 includes a bottom urethane covered vented roll 11 of this invention, a top roll 12 cooperating therewith to define a high pressure nip 13 therebetween, and a paper machine felt 14 conveying a wet web 15 on its underface through the nip 13.

The roll 11 of this invention is a hollow metal cylinder 16 vented to the atmosphere as illustrated at 16a with its cylindrical surface surrounded by a urethane resin cover 17 bonded thereto by a substrate bond 18. The cylindrical surface is preferably abrasive blasted and degreased before receiving the substrate 16. The urethane cover 17 confronts the web 15 as it passes through the nip 13 and is sufficiently rigid or hard to resist collapse in the high pressure nip zone. The cover also is impervious and squeezes water from the web into the felt 14.

The cylinder 16 has a myriad of radial holes 19 drilled therethrough venting the bond 18 to the atmosphere. As illustrated in FIG. 3, these holes 19 extend in diagonal rows along the length of the cylinder 16 so that they go through the nip area 13 at an angle to prevent a continuous discontinuity in the cover across the length of the roll thereby maintaining the stability of the nip and minimizing vibration in the press couple. As also shown in FIG. 3, the bond substrate 18 is applied to the cylinder to a desired thickness from a spray gun 20.

As shown in FIG. 4, the cylinder 16 with the substrate coating 18 is immersed in a mold 21 and the urethane cover 17 is cast in the mold around the substrate bond. The cast cover and the adhesive are allowed to set in the mold.

It will thus be apparent that the press roll 11 has the interface between the metal cylinder 16 and the cover 17 vented to the atmosphere through the myriad of holes. The voids provided by the holes, however, are sealed from the pressure nip 13 by the adhesive bond and urethane cover. These open spaces or voids are successively presented to the nip since they are inclined at an angle relative to the nip and advance successively through the nip eliminating any continued void line along the length of the nip.

As shown in FIGS. 5 and 6, an alternate urethane covered press roll 10a of this invention is also provided. Parts corresponding with parts of the roll 10 have been marked with the same reference numerals.

In the roll 10a, a substrate coat 22 has inclined or oval circumferential grooves 23 therearound intersecting with diagonal longitudinal grooves 24 resulting in a lattice pattern vented to the ends of the cylinder 16. These grooves can be formed by combing the substrate cover 22 before it sets or by grooving a jelled substrate or by printing the lattice design on the roll cylinder 16. The urethane cover 17 is then cast around the substrate as in FIG. 4. If the grooves 23 and 24 tend to become clogged during the casting operation, they can be initially filled with a low melting or soluble filler which is removed after casting.

The bond 22 is thus vented to the atmosphere through the circumferential grooves 23 and the intersecting longitudinal grooves 24 which open to the ends of the cylinder.

Figures 8, 9:
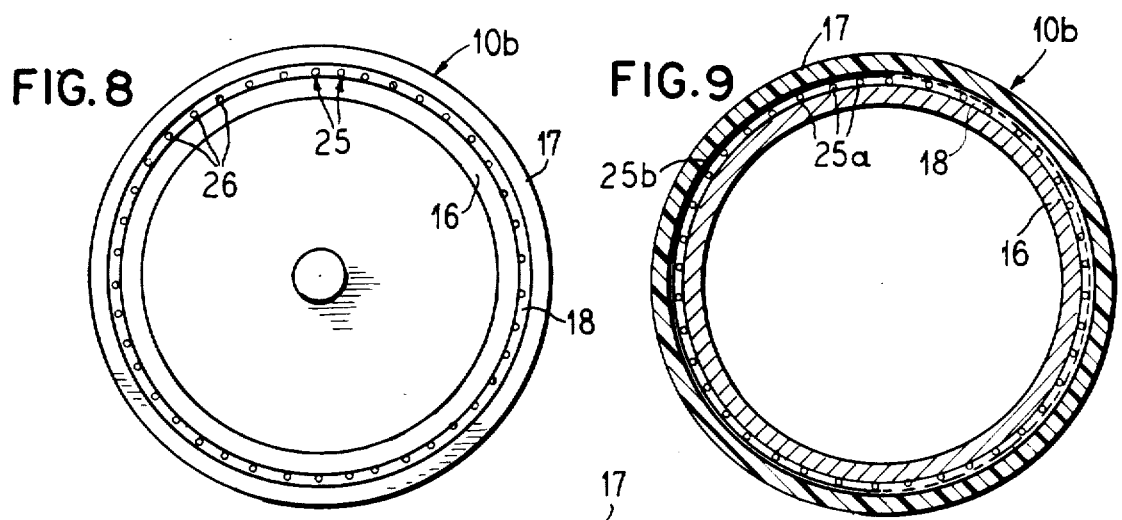
FIG. 8 is a cross-sectional view along the line VIII—VIII of FIG. 7.
FIG. 9 is a cross-sectional view along the line IX—IX of FIG. 7.

A further modified press roll 10b of this invention is illustrated in FIGS. 7 to 9 where parts corresponding to the abovedescribed parts have been marked with the same reference numerals.

In the roll 11b, the venting of the substrate 18 is accomplished by strings or cords 25 stretched longitudinally and wound circumferentially around the cylinder 16 and embedded in the substrate 18. These cords or strings can be formed of candle wick material, such as as cotton where the fibers will soak up any moisture and wick it to the ends of the roll. As shown, some of the strings 25a are stretched along the length of the roll 16 in inclined diagonal paths while other strings 25b are wound helically around the cylinder 16 in contact with the longitudinal strings 25a. In this manner, the substrate or bond 18 is contacted at close areas with the strings 25 and the strings in turn soak up the moisture and wick it to the ends of the roll where the longitudinal strings 25a are exposed to the atmosphere as illstrated at 26 in FIG. 8.

Figure 10:
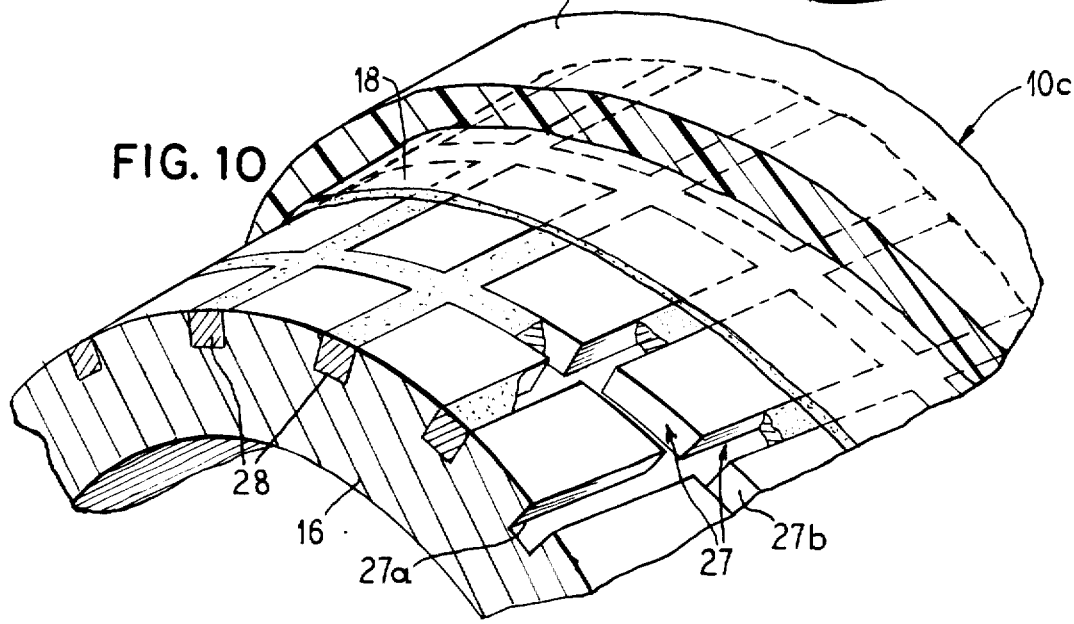
FIG. 10 is a fragmentary perspective view showing a grooved press roll according to this invention.

FIG. 10 illustrates another modified roll 10c wherein the roll cylinder 16 has longitudinal and circumferential grooves 27 at a depth of ⅛ to ¼ inches and spaced apart about ¼ to ½ inches. The longitudinal grooves 27a extend diagonally along the length of cylinder 16 and communicate with the ends of the cylinder. The intersecting grooves 27b extend helically around the cylinder 16. The grooves are initially filled with a low melting material as illustrated at 28. Materials such as Wood's and "Rose" metal can be used. The adhesive bond 18 is coated around the roll, the urethane cover is then cast around the bond and after the assembly has been cured, it is heated to melt out the filling 28. The resulting roll 10c thus has the bond or interface area vented to the atmosphere through the grooves.

The above descriptions make it clear to those skilled in this art that this invention prolongs the life of urethane covered paper machine rolls by venting the bonded interface between the metal roll and the plastics cover to the atmosphere.

I claim as my invention:

1. A paper machine roll for use in a water environment which comprises a metal cylinder, a urethane adhesive coating said cylinder, a urethane cover surrounding said cylinder in integrally bonded relation therewith through said adhesive, said urethane cover presenting a continous imperforate surface on the roll and also permitting moisture from said water environment to pass therethrough to an interface between said cylinder and said cover at which said adhesive is located, and passageways in direct fluid communication with the interface between the cover and the cylinder for draining moisture from said interface for maintaining the adhesive bond between the cylinder and cover.

2. The roll of claim 1 wherein said passageways are closely spaced drilled holes through the cylinder.

3. The roll of claim 2, wherein the holes are positioned lengthwise of the cylinder in patterns which are inclined to the longitudinal axis of the cylinder.

4. The roll of claim 1 wherein the passageways are longitudinal and circumferential grooves between the cover and cylinder.

5. The roll of claim 1 wherein the passageways are moisture conducting wicks exposed to the ends of the cylinder.

6. The roll of claim 1 wherein the passageways have intersecting helical and longitudinal portions.

7. The roll of claim 1 wherein the passageways extend longitudinally in inclined relation to the axis of the cylinder.

8. A paper machine press roll for use in a water environment which comprises a metal cylinder, a urethane cover surrounding said cylinder and presenting a continous imperforate peripheral surface and permitting moisture from said water environment to pass therethrough to an interface between said cover and said cylinder, an adhesive disposed at said interface bonding said cover to said cylinder, and means in direct fluid communication with the interface venting the adhesive to an end of the cylinder for draining moisture from said interface for maintaining the adhesive bond between the cylinder and cover.

9. The roll of claim 8 wherein the cover is cast around the adhesive.

10. The roll of claim 8 wherein the means venting the adhesive extends diagonally along the length of the cylinder and is exposed to an end of the cylinder.

11. A urethane covered metal paper machine press roll subjected in use to a wet pressure nip and temperature differentials between the cover and metal which comprises a metal cylinder, a continuous imperforate urethane cover cast around said cylinder and permitting moisture to pass therethrough to an interface between said cover and said metal, a bond at said interface uniting the cover to the cylinder, and means in direct fluid communication with the interface between the cover and the metal venting the bond along the length of the cylinder to the ends of the cylinder at close spaced intervals for draining moisture from said interface to maintain said bond under the wet nip and temperature differential operating conditions.

* * * * *